April 4, 1967 HWA N. YU 3,312,881

TRANSISTOR WITH LIMITED AREA BASE-COLLECTOR JUNCTION

Filed Nov. 8, 1963 3 Sheets-Sheet 1

INVENTOR
HWA N. YU

BY John F. Ohlandt Jr.

ATTORNEY

United States Patent Office 3,312,881
Patented Apr. 4, 1967

3,312,881

TRANSISTOR WITH LIMITED AREA BASE-COLLECTOR JUNCTION

Hwa N. Yu, Yorktown Heights, N.Y., assignor to International Business Machines Corporation, New York, N.Y., a corporation of New York Filed Nov. 8, 1963, Ser. No. 322,383
3 Claims. (Cl. 317—235)

This invention relates to semiconductor devices, and more particularly to a transistor structure suitable for operation at high frequencies or high speeds, and to the method of fabricating such a structure.

The increased emphasis in transistor design on achieving extremely high speeds of operation, notably for use in computer circuitry, has led to intensive study of ways of controlling the important parameters which govern the attainment of high speed operation.

A significant advance in transistor design has been the exploitation of the diffusion technique for forming pn junctions near semiconductor surfaces by the diffusing-in of impurities from the surfaces. The diffusion technique makes possible the precise and controllable location of junctions and the control of the separations between the junctions in multiple-junction structures. For an understanding of the attributes and advantages of junction transistor fabrication by diffusion, reference may be had to an article by C. A. Lee entitled, "High Frequency Diffused Base Germanium Transistors," Bell Systems Technical Journal, 1956, vol. 25, page 23.

The fact that a very thin base layer, on the order of microns in thickness, can be achieved in the diffused base transistor leads to alpha cutoff frequencies in the neighborhood of 500 mc./sec. or higher. In this type of transistor, the very high alpha cutoff frequency has been attained by reducing the base layer thickness, but without sacrifice to the gain-band product of the device. Also, since the distribution of impurities by diffusion through the base layer is not uniform, there results a permanent built-in electric field across the base layer which helps minority carriers to cross this layer and consequently shortens the transit time.

The aforesaid advantages of transistor fabrication utilizing the diffusion technique have been incorporated into the so-called mesa or planar transistors, descriptions of which may be obtained from an article by P. D. Payne, "Technology of Transistor Mask Fabrication," Semiconductor Products, May 1962, pages 32 through 36.

Although attainment of extremely high alpha cutoff frequencies is an important objective in high speed transistor design, another basic objective in such design is to produce devices having high gain band-width product. The gain band-width product is a well-known figure of merit in transistor design and is given by the expression, $$\text{power gain band-width product} \approx \frac{\alpha^2}{8\pi r_b C_c}$$

where $r_b$ is the effective base resistance and $C_c$ is the collector capacitance. Thus, a high gain band-width product is sought to be obtained through the reduction of $r_b$ and $C_c$.

Accordingly, it is a primary object of the present invention to reduce the collector capacitance in the fabrication of a high speed transistor, particularly of the mesa or planar type.

Another object of the present invention is to permit the reduction of the base resistance of a high speed transistor, concomitantly with reduction of the collector capacitance.

In the conventional mesa or planar transistor, previously referred to, the collector-base junction is relatively large due to the nature of the transistor structure, even though the overall dimensions of the device are quite small. By a feature of the present invention the collector capacitance $C_c$, due to this relatively large collector-base junction is significantly reduced.

With regard to the effective base resistance $r_b$, the reduction of which is a concern of the present invention, much of this resistance in the equivalent circuit of a junction transistor is the distributed sheet resistance of the base layer from the point of attachment of the base electrode to all points in the layer. As was brought out above, the base layer must be made extremely thin to reduce the transit time and this is achieved by forming the base layer by diffusion. However, making the base layer so thin results in an increase in $r_b$.

In the context of the conventional mesa or planar transistor fabrication a solution to the problem of reducing base resistance would be to increase the available area for the formation of a relatively large base contact. The formation of such a relatively large base contact would contribute significantly to reduction of the total base resistance. However, the difficulty with such a solution in this environment is that it would entail a further increase in the already relatively large collector-base junction area, with an attendant increase in the collector capacitance, which tends to lower the gain of the transistor, as indicated heretofore, at the very high frequencies of operation.

To the end of reducing the collector capacitance and base resistance, thereby to achieve a high gain band-width product, it is a broad feature of the present invention to provide an additional layer of intrinsic material situated between the base and collector regions of the transistor so as to isolate the major portion of the base region from the collector region, thereby to eliminate the contribution of this portion to collector capacitance. Thus, the junction area is limited to the desirable minimum with regard to collector capacitance consonant with effective collection of carriers which diffuse through the base region.

The foregoing and other objects, features and advantages of the invention will be apparent from the following more particular description of preferred embodiments of the invention, as illustrated in the accompanying drawings:

Figure 1:
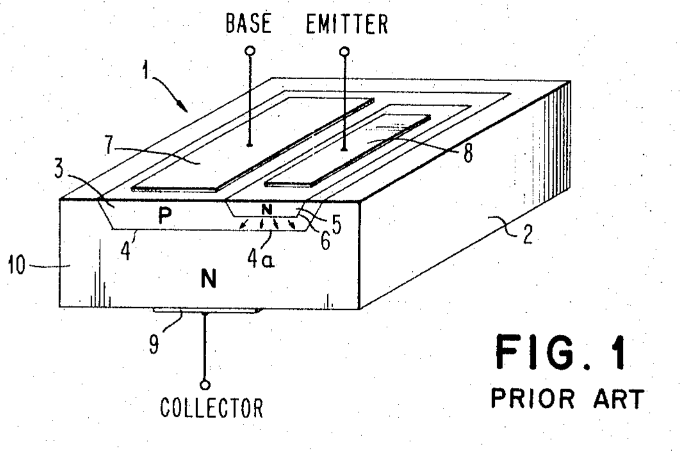
FIG. 1 PRIOR ART
FIGURE 1 is a perspective view of a conventional planar npn transistor, known in the prior art.

Referring now to FIGURE 1 there is shown a typical planar npn transistor as is known in the prior art. The transistor, generally designated by numeral 1, is achieved by diffusing an opposite conductivity type impurity into a masked area on one surface of a semiconductor wafer or substrate 2. Thus, for example, in FIGURE 1 a p conductivity region 3 has been produced by the diffusion of a p conductivity-determining impurity into the n conductivity substrate 2 to define the collector-base junction 4. It will be appreciated, of course, that this can be done for a large plurality of devices, in which case diffusion is carried out on the aforesaid surface of the substrate 2 selectively in discrete areas to produce the desired plurality of separated collector-base junctions.

After the initial diffusion step described above, the emitter is formed, again by the technique of diffusion. The appropriate impurity is diffused onto a limited portion of the already formed p type base region 3 to convert part of that region to n conductivity, thus forming emitter region 5, which with base region 3 defines emitter-base junction 6. Base and emitter stripes 7 and 8 are formed on the top surface and these stripes constitute ohmic contacts to their respective regions 3 and 5. Ohmic contact 9 is then made to the collector region 10 which corresponds with the unconverted bulk of the substrate 2. For circuit connecting purposes, of course, electrical conductors are affixed to the several ohmic contacts 7, 8 and 9.

Figure 2:
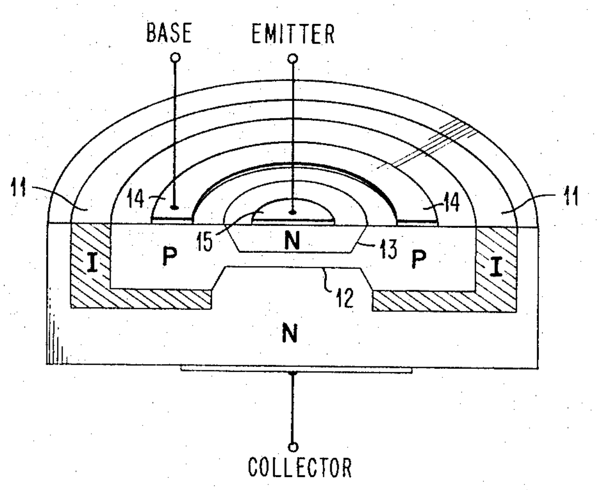
FIGURE 2 is a cross-sectional, perspective view of a planar transistor embodying the principles of the present invention.

In the conventional operation of the device of FIGURE 1, with suitable biases applied via electrical conductors to the several contacts 7, 8 and 9, there will be injection of minority carriers from the emitter region 5 into the base region 3, these minority carriers diffusing, as well-known, over to the collector base junction 4. Carrier collection takes place to a significant degree only in that portion of the collector-base junction indicated by the several arrows in FIGURE 1. Thus, although the entire extent of the junction is contributing to the collector capacitance, approximately one third of the junction is effective in the collection of carriers Referring now to FIGURE 2, the improvement over the conventional planar transistor of FIGURE 1 is depicted. In FIGURE 2 it will be noted that a layer of intrinsic material 11 has been formed within the semiconductor body so as to eliminate the major portion of the junction area that is usually defined by the contiguity of base and collector regions of opposite conductivity type and which normally contributes to the collector capacitance but contributes insignificantly to carrier collection. The collector-base junction 12 is now effectively confined to just that portion, as was shown in FIGURE 1, where carrier collection takes place to a significant degree. The exact delineation is accomplished in such a manner that the active portion 12 is aligned with the emitter-base junction 13, overlapping it substantially equally on both sides.

With the interposition of additional layer 11 of intrinsic material the carrier collecting portion is thus fixed but the base contact is now allowed to assume almost any shape without corresponding increase in capacitance as would be the case with a conventional design.

The precise implementation of the improved transistor structure of the present invention, as shown in FIGURE 2, utilizes a ring contact 14 to the base region to obtain the desired low base resistance. The emitter contact 15 is shown as a dot within the ring base contact 13.

Figure 3:
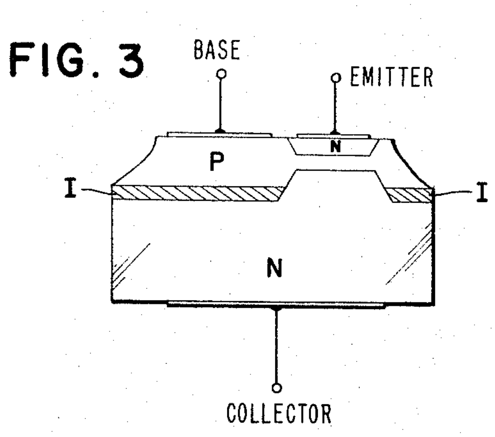
FIGURE 3 is a cross-sectional view of a mesa transistor, illustrating another embodiment of the principles of the present invention.

Referring now to FIGURE 3, another embodiment is shown of the principle of the present invention in a mesa type structure. The mesa configuration, as conventionally realized, is produced by initially forming an extensive pn junction within the semiconductor body and then delimiting discrete junctions for individual devices by means of an etching operation so as to form mesa-like plateaus above the substrate. As was shown previously in FIGURE 1, but here in a cross-sectional view, base and emitter contacts are formed to their respective regions. As was the case in the embodiment of FIGURE 2, there is shown the feature of the interposed intrinsic region serving to eliminate the portion of the collector-base junction which is passive, that is the portion which does not contribute significantly to carrier collection. Again, there is orientation of the collector-base junction so as to be precisely in alignment with the emitter-base junction for most efficient operation.

The particular process of fabricating the npn planar transistor embodiment of FIGURE 2 will now be described. It will be appreciated that, although a planar configuration will be discussed, a mesa configuration such as exemplified by FIGURE 3 can also be realized by suitable modification. It will also be noted that in the description which follows reference will be made to an npn transistor but it will be understood that a transistor of opposite polarity type, that is, a pnp transistor, may just as well be formed by beginning with a substrate of opposite conductivity type and by modifying the process steps so as to utilize different impurities at appropriate times.

Figure 4A:
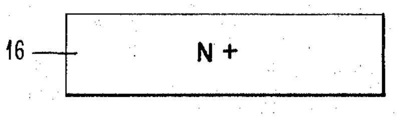
FIGURES 4A–4F are cross-sectional views, illustrating the various stages in the fabrication of a planar npn transistor in accordance with the technique of the present invention.
Figure 4B:
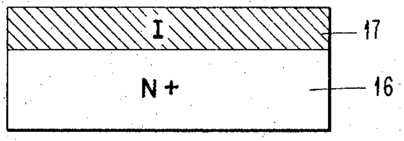

The starting material for the npn planar transistor embodiment of the present invention is an $n+$ type of semiconductor wafer 16 having a thickness on the order of 4 or 5 mils, as shown in FIGURE 4A. This wafer is lapped, etched and polished and thereafter, as shown in FIGURE 4B, an intrinsic layer 17 of a thickness in the range of 1–5 microns is epitaxially grown onto the $n+$ semiconductor wafer 16. It will be understood that the symbol $n+$ refers to a conductivity which is extremely high due to a doping level of about $10^{17}$ atoms/cm.$^3$ or greater. If the semiconductor material is selected to be silicon, for example, the $n+$ type wafer will be realized by doping with a typical impurity such as phosphorus. Of course, with other semiconductor materials, other appropriate dopants will be selected.

The growth of the intrinsic layer is achieved by a technique of vapor growth, such as disclosed in U.S. Patent No. 3,047,438 issued July 31, 1962, assigned to I.B.M. using a halide disproportionation or pyrolytic process.

Figure 4C:
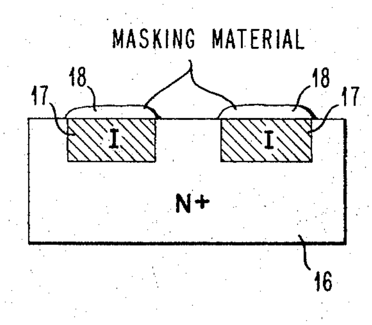

As shown in FIGURE 4C a portion of the layer of intrinsic material has been masked with masking material 18 and by a diffusion operation, n type impurity atoms, such as of phosphorus, are caused to penetrate through the intrinsic layer where the masking material is not present, effectively joining the diffused portions with the $n+$ type substrate. A suitable masking material would be a material like silicon oxide which may be selectively formed on the intrinsic layer by oxidation of the silicon surface and by a masked etching procedure, well known to those skilled in the art.

Figure 4D:
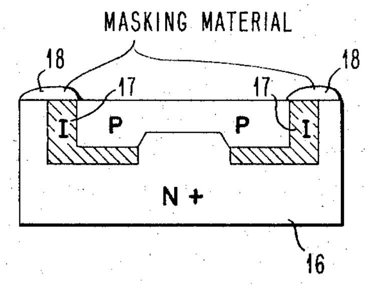
Figure 5A:
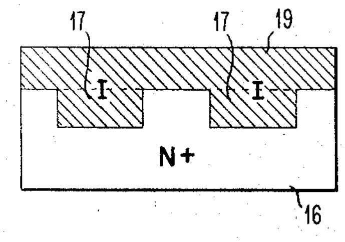
FIGURES 5A–5C are cross-sectional views, illustrating some of the steps in the formation of planar transistors of the present invention, but modified to include a thin epitaxial intrinsic layer within the active portion of the collector-base junction.
Figure 6A:
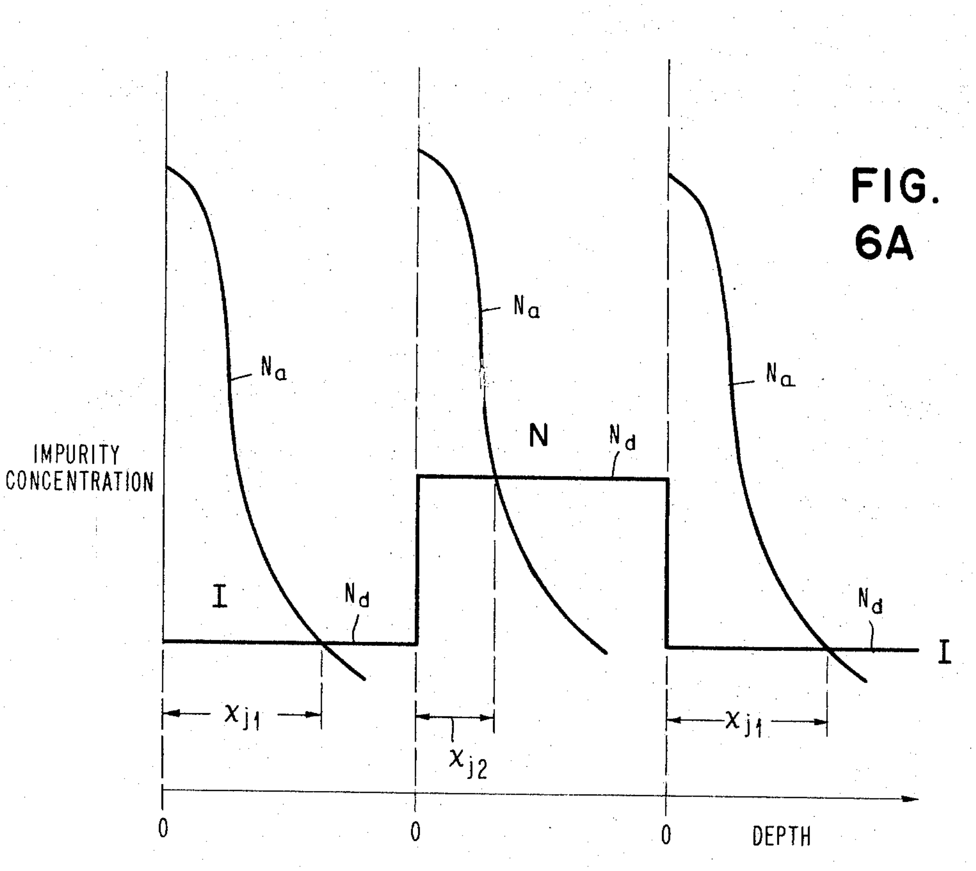
FIGURE 6A depicts the impurity concentration profile due to the diffusion of impurities into the semiconductor body.
Figure 6B:
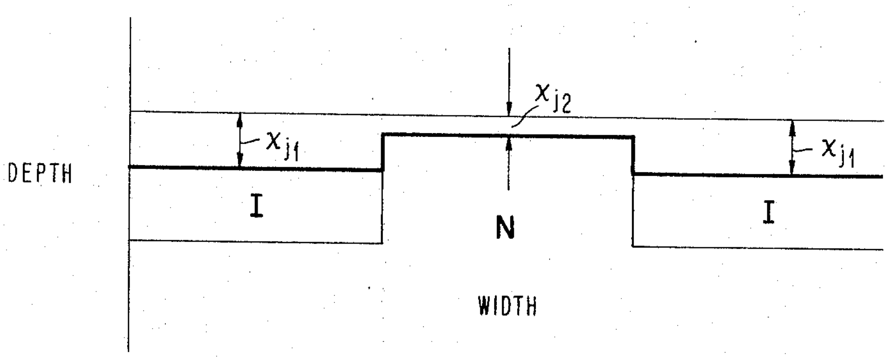
FIGURE 6B depicts the resultant profile of the junction depths within the semiconductor body.

The masking material originally formed on the surface is now removed by etching and masking material is again applied as shown in FIGURE 4D for base region diffusion. This is accomplished by using a p type determining impurity, such as boron, which upon diffusion into the water produces a p type base region in the configuration shown. There will, of course, be some p type impurity diffusion into the opposite surface so as to convert a layer therein but this, of course, can be lapped off. It will be noted that in FIGURE 4D the central portion, that is the actual pn junction, is offset slightly from the intrinsic layer. The reason for this will be understood by referring to FIGURES 6A and 6B. In FIGURE 6A a graph of the impurity distribution within the semiconductor body is depicted. The impurity concentration is plotted against the depth onto the semiconductor body from a surface onto which the diffusion takes place. The impurity distribution due to the diffusion process assumes the same profile in the bulk material regardless of the background impurity concentration, that is, the penetration of impurities into the body from the surface will be the same when performed under the same conditions. Different junction depths can, however, result due to different background concentrations. In the case depicted in FIGURE 5A, if p type diffusion is performed, the junction depth will be greater in the intrinsic region than it is in the n type region due to the difference in the background n type impurity concentration. Thus, although the diffusion front for the p type impurity is the same for the three regions, that is, the two extreme intrinsic regions, which are weakly n type, and the middle region which is strongly n type, the point at which the p type impurity concentration is equal to the n type impurity concentration differs in the two intrinsic regions compared with the n type region. Hence, the junction depths $X_{j1}$ in the intrinsic regions is greater than the junction depth $X_{j2}$ for the n type region. This accounts for the fact that in FIGURE 6B there is a corresponding offset in the junction depth profile.

Figure 4E:
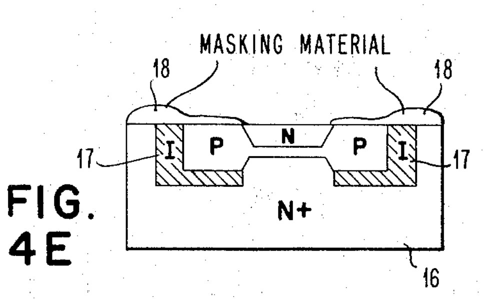

Another layer of masking material is now disposed on the surface as shown in FIGURE 4E and an n type emitter region is obtained, again by using an a type impurity such as phosphorus. Finally, as shown in FIGURE 4F, ohmic contact materials are applied to their respective regions by conventional masking and evaporation.

Figure 5B:
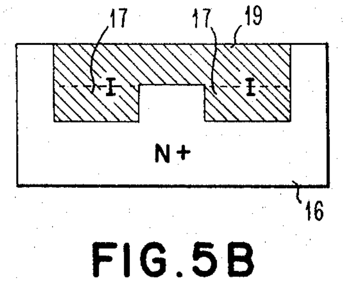

Although simple three region structures have been illustrated and disclosed heretofore, it will obvious that other more sophisticated structures can be realized utilizing the basic principle of the present invention. For example, a procedure for providing a thin intrinsic barrier layer between the base and collector regions of opposite conductivity type, within the defined active carrier collecting portion of the junction, can be adopted. This procedure is illustrated in part in FIGURES 5A–5C. After the step previously illustrated in FIGURE 4C another epitaxial intrinsic layer 19 having a thickness of 1–5 microns is grown on top of the wafer 16 to produce the configuration shown in FIGURE 5A. Then, by masking off almost the entire extent of the top surface of wafer 16 and allowing diffusion to take place only at the extremities thereof, there is produced the configuration depicted in FIGURE 5B.

Figure 4F:
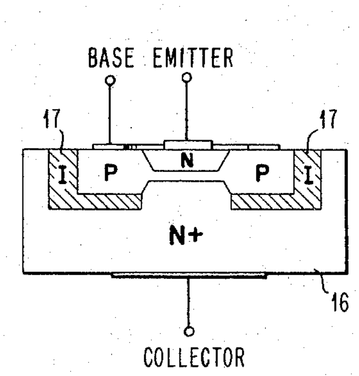
Figure 5C:
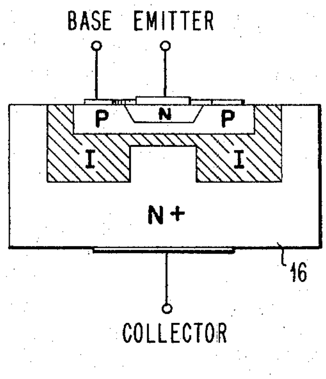

Now the same steps that were illustrated in FIGURES 4D through 4F are performed and the result is the npin planar transistor shown in its final form with all contacts made to the structure in FIGURE 5C. It will again be understood that the opposite polarity, or the pnip structure, can be similarly achieved.

What has been disclosed is a novel technique of producing a high speed transistor structure by which is fulfilled the objectives of (1) significantly reducing the collector capacitance by virtue of limiting the contributions to capacitance by the collector-base junction to the active carrier collecting portion thereof, and (2) permitting reduction of base resistance by expansion of the available base contact area, due to the fact that increasing the total base junction area will no longer cause an increase in collector capacitance.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A semiconductor device comprising a crystalline body having a plurality of regions differing in conductivity type and comprising a collector region of a first conductivity type constituting the bulk of said body, a base region of a second conductivity type extending from the surface of said body and defining therewithin a junction of limited extent, an intrinsic region extending from the extremity of said junction to said surface disposed between said base and collector regions and an emitter region formed at said surface in spaced alignment with said junction of limited extent.

2. A semiconductor device as defined in claim 1 and including ohmic contacts to said emitter, base and collector regions.

3. A semiconductor device as defined in claim 1 wherein said crystalline body is composed of silicon, said collector region is n conductivity type due to the presence of phosphorous and said base region is p conductivity type due to the presence of boron.

References Cited by the Examiner

UNITED STATES PATENTS

| | | | |
|---|---|---|---|
| 2,967,344 | 1/1961 | Mueller | 317—235 |
| 3,008,089 | 11/1961 | Uhlir | 317—235 |
| 3,025,589 | 3/1962 | Hoerni | 317—235 |
| 3,054,034 | 9/1962 | Nelson | 317—235 |
| 3,063,879 | 11/1962 | Strull | 317—235 |
| 3,096,259 | 7/1963 | Williams | 317—235 |
| 3,108,914 | 10/1963 | Hoerni | 148—186 |
| 3,109,760 | 11/1963 | Coetzberger | 148—186 |
| 3,163,562 | 12/1964 | Ross | 317—234 |

FOREIGN PATENTS

| | | |
|---|---|---|
| 1,284,564 | 1/1962 | France. |

DAVID J. GALVIN, *Primary Examiner.*